T. ZUROWSKI.
TRAP.
APPLICATION FILED MAY 15, 1914.
1,120,114.
Patented Dec. 8, 1914.
2 SHEETS—SHEET 2.
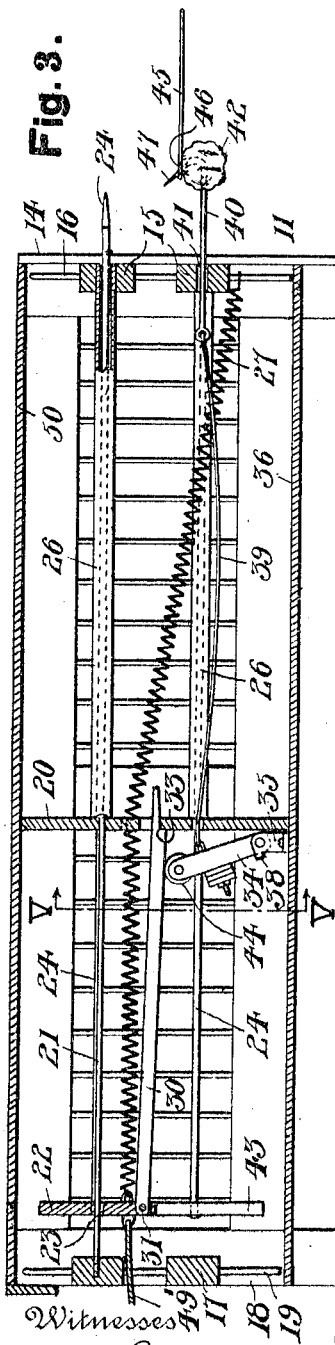
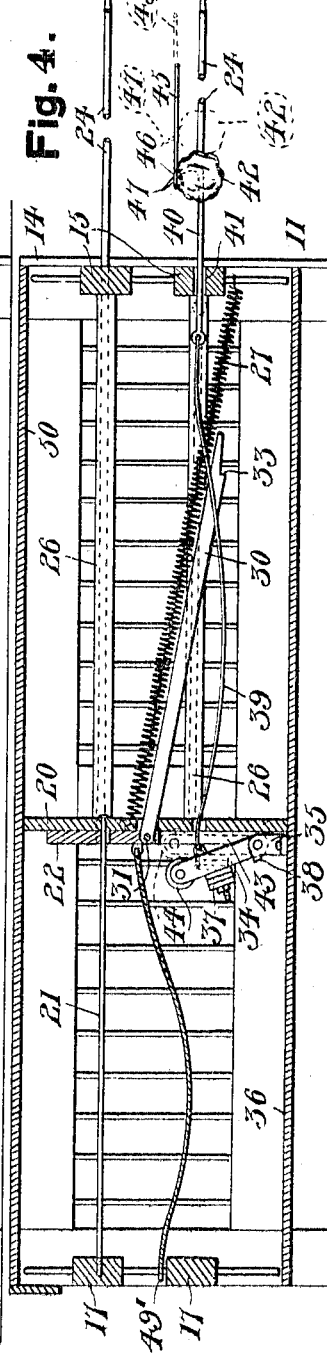
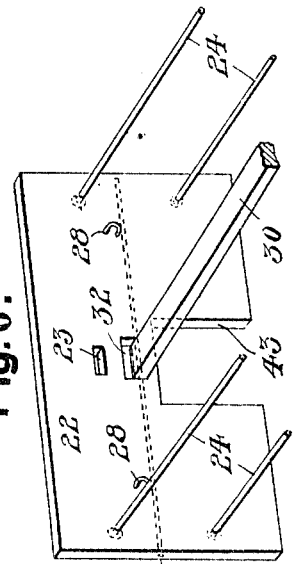
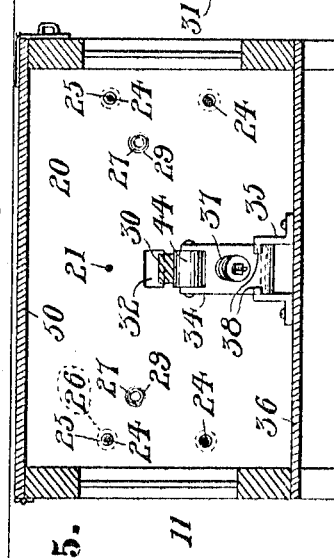
Witnesses
M. E. Lowry
D. W. Bryant
Inventor
Tomasz Zurowski
By
A. M. Wilson
Attorney

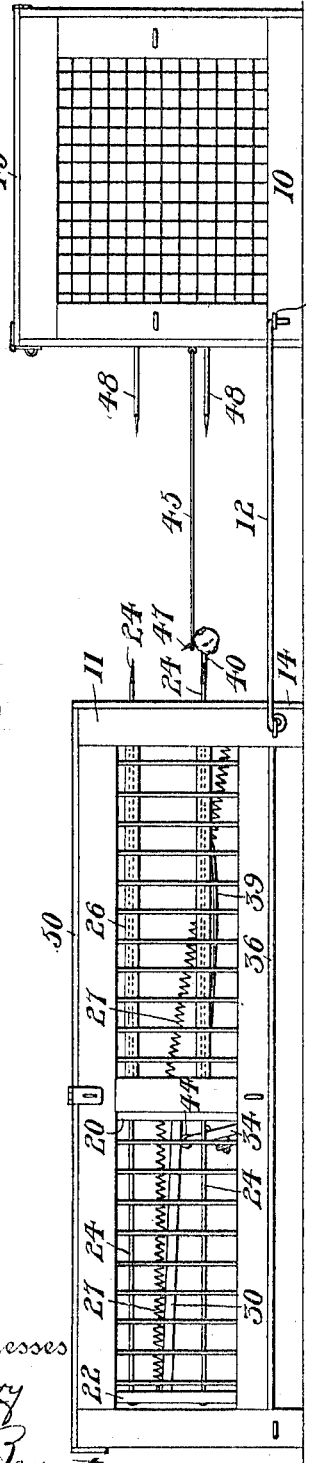

UNITED STATES PATENT OFFICE.

TOMASZ ZUROWSKI, OF HAMMOND, INDIANA.

TRAP.

1,120,114. Specification of Letters Patent. Patented Dec. 8, 1914.

Application filed May 15, 1914. Serial No. 838,749.

*To all whom it may concern:*

Be it known that I, TOMASZ ZUROWSKI, a citizen of the United States, and residing at Hammond, in the county of Lake and State of Indiana, have invented certain new and useful Improvements in Traps, of which the following is a specification.

This invention relates to certain new and useful improvements in traps.

The primary object of this invention is the provision of an animal trap provided with a means for positioning live bait for the attraction of animals whereby such animals will be led to a position for tripping the impaling spikes of the trap.

A further object is to provide a live bait animal trap adapted when sprung to automatically project sharpened spikes into the body of the caught animal.

A still further object is to provide a cage for live bait positioned in spaced relation to a trap mechanism casing and so arranged that the trap will be operatively tripped upon the positioning of an animal in contact with tripping means between the said separated elements.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and wherein like designating numerals refer to corresponding parts throughout the several views:—Figure 1 is a side elevation of the device set for the catching operation. Fig. 2 is a top plan view thereof with the cover of the mechanism casing removed. Fig. 3 is a vertical longitudinal central sectional view taken through the trap mechanism casing, the outer trip wire and the set cord being broken away, and with the elements in their set positions. Fig. 4 is a view similar to Fig. 3 with the elements in their tripped positions and as assumed after the trap has been sprung. Fig. 5 is a vertical transverse sectional view upon line V—V of Fig. 3, and, Fig. 6 is a perspective view of the shiftable latch plate with the members carried thereby broken away.

Referring more in detail to the drawings, it is to be noted that the invention broadly consists in a receptacle or cage 10 adapted for holding live bait, the said cage being normally held spaced apart from the casing 11 designed for holding the trap mechanism by means of spacing hooks 12 carried by the casing and engaging opposite staples 13 upon the cage. Any desired number of spacing hooks 12 may be employed but for purposes of illustration, only two are shown and these are positioned adjacent the bottoms of the casing and cage.

The forward end 14 of the casing is provided with parallel transverse strips 15 secured to the forward bars 16 thereof while similar strips 17 are provided at the rear end 18 of the casing and secured to the rear bars 19 thereof.

A substantially centrally positioned partition or keeper plate 20 is provided within the casing, being connected with one of the rear strips 17 by means of the brace 21. A latch plate 22 is provided with a perforation 23 and through which perforation the bar 21 extends, thereby slidably-mounting the latch plate upon said bar within the casing and rearwardly of the keeper plate 20. Impaling spikes 24 are rigidly secured, four in number, extending through perforations 25 in the keeper plate 20 and also through tubes 26 positioned for their reception between the keeper plate 20 and the front end of the casing, at which front end, the tubes 26 extend through and are supported by the strips 15. The spikes 24 are of sufficient length to project at all times forwardly of the front end 14 of the casing, and are suitably sharpened as herein illustrated.

Two coil springs 27 have their outer ends secured to staples 28 upon the latch plate and extend through perforations 29 in the keeper plate and have their forward ends secured to the forward bars 16 of the casing and whereby a forward tendency is exerted upon the latch plate.

A latch 30 is pivoted as at 31 to the latch plate and extends through a central perforation 32 in the keeper plate and is provided with a bottom notch 33 adapted to seat upon the bottom of the opening 32 when the latch plate is pushed rearwardly to the limit of its movement and with the springs 27 placed under tension, thus positioning the trap elements in their set relations.

A trip 34 is hinged to opposite brackets 35 upon the bottom 36 of the casing and is provided with a rear weight 37 normally positioning the trip rearwardly inclined as illustrated in Fig. 4, while the rearward tilting thereof is limited by the stop lugs 38 upon the pivoting brackets 35.

A trip wire 39 is secured at one end to the trip 34 and at its other or forward end to a bait hook 40, which hook is slidably-mounted in a perforation 41 through one of the strips 15.

From this construction, it will be apparent that any forward pull exerted upon the bait hook 40 or the bait 42 positioned thereon, results in tilting the trip 34 from its inclined position beneath the set latch 30 as illustrated in Fig. 3, to a substantially vertical position, thus elevating the latch 30 and disengaging the same from the keeper plate 20 whereupon the springs 27 forcibly slide the latch plate 22 and its spikes 24 forwardly until said latch plate engages the rear face of the keeper plate as illustrated in Fig. 4, and with the trip 34 freely accommodated within the opening 43 of the latch plate.

The trip 34 is provided with an anti-friction roller 44 at the upper free end thereof for engaging the lower face of the latch 30. It will be apparent that such a movement of the latch plate and spikes 24 will position the sharpened ends of said spikes within the body of any animal which is positioned in the paths of such spikes and between the cage and the casing.

A set cord 49' is secured to the rear face of the latch plate and extends between the rear bars 19 thereof, and it will be seen that when the elements are positioned as illustrated in Fig. 4, a rearward pull upon the cord forces the latch plate 22 rearwardly until the latch 33 engages the perforation 32 of the keeper plate at which time the springs 27 will be placed under tension with the trap set.

While any desired bait may be positioned upon the bait hook 40, it is intended that the live bait within the cage 10 will attract animals that will then enter between the casing and cage to more easily procure the bait 42. An outer trip wire 45 is secured to the inner side of the cage and provided with a terminal loop 46 which fits over the hooked end 47 of the bait hook above the bait 42 and it will be evident that any strain brought upon the wire 45 will tend to outwardly move the bait hook, thus springing the trap.

The complete operation of the device, it is thought will be apparent from this detailed description thereof, it being noted that fixed sharpened spikes 48 are mounted upon the sides of the cage adjacent the casing and which spikes are for the purpose of receiving the body of the animal which has been impaled by the sliding spikes 24. It will be evident that any desired form of bait may be employed upon the hook 40 while any live animal or bird may be placed within the cage 10 and secured therein against any theft or injury from any animals. The cage 10 is provided with a cover 49 while a hinged closure 50 is positioned upon the trap mechanism casing, both the cage and the casing having barred or grated side walls.

While the forms of the invention herein shown and described are what are believed to be preferable embodiments thereof, it is nevertheless to be understood that various forms and modifications may be resorted to which fall within the spirit and scope of the invention as claimed.

What I claim as new is:—

1. A device of the class described, comprising a cage, a casing spaced therefrom, a guided latch plate slidably-mounted within said casing, forwardly-projecting impaling spikes mounted upon said latch plate and projecting in the space between said cage and casing, tubular guides carried by said casing through which the spikes extend, spring members tensioned between said latch plate and the forward end of said casing, a latch pivoted to said latch plate and movable therewith, a keeper plate adapted to be engaged by said latch, a weighted trip adapted for engaging said latch, and a tripping member connected to said trip and extending between said cage and casing to operate said trip, whereby the latch is released from the keeper plate to permit the spring members to project said spikes through the tubular guides toward the cage.

2. An animal trap comprising a bait cage, a casing secured in spaced relation thereto, pointed spikes upon the side of said cage adjacent to said casing, a centrally-positioned keeper plate within said casing provided with a central opening, a latch plate slidably-mounted within said casing, impaling spikes carried by said latch plate and extending in the space between said cage and casing, guide tubes within said casing surrounding said spikes, a latch pivoted to said latch plate and extending through the keeper plate perforation and adapted for engaging said plate when the trap is in its set position, spring members secured between said latch plate and the forward end of said casing, a weighted trip pivoted beneath said latch and adapted for engagement therewith, a bait hook positioned between said cage and casing and slidably-mounted in the casing, a trip wire between said trip and hook, an outer trip wire between said cage and hook, and a set cord secured to said latch plate and extending rearwardly of said casing.

In testimony whereof I affix my signature in presence of two witnesses.

TOMASZ ZUROWSKI.

Witnesses:
BOLESLAW SALIK,
B. GEHRING.

Copies of this patent may be obtained for five cents each, by addressing the "Commissioner of Patents, Washington, D. C."